Oct. 13, 1953

C. B. TRIMBLE 2,655,606

RECEIVING APPARATUS FOR CONTROLLING
GARAGE DOORS AND LIGHTS

Original Filed March 15, 1946

INVENTOR.
CEBERN B. TRIMBLE
BY
Louis A. Kline
HIS ATTORNEY

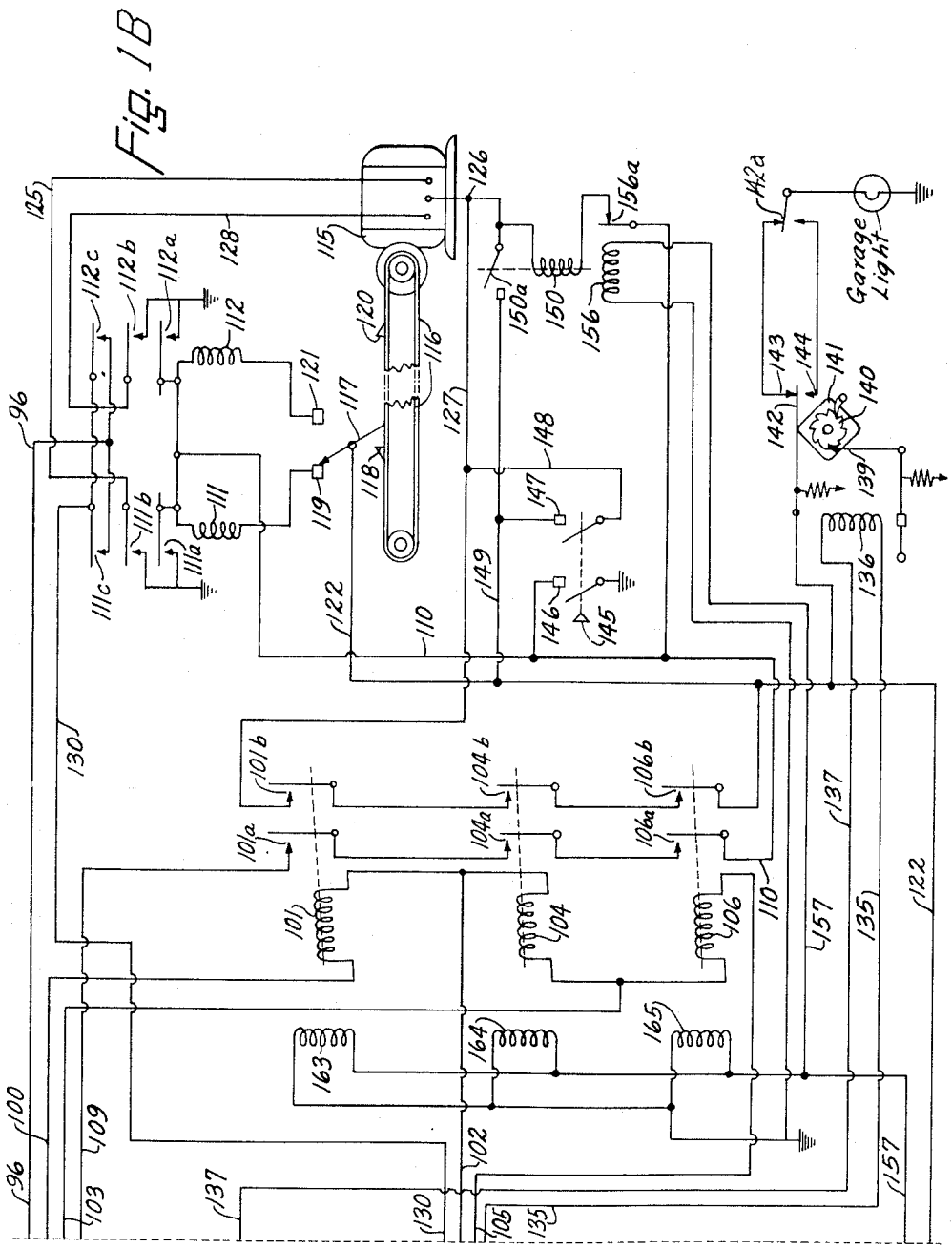

Patented Oct. 13, 1953

2,655,606

UNITED STATES PATENT OFFICE 2,655,606

RECEIVING APPARATUS FOR CONTROLLING GARAGE DOORS AND LIGHTS

Cebern B. Trimble, Dayton, Ohio

Original application March 15, 1946, Serial No. 654,561, now Patent No. 2,558,888, dated July 3, 1951. Divided and this application March 17, 1951, Serial No. 216,229

12 Claims. (Cl. 307—40)

This invention relates to a novel receiving apparatus and in particular to a receiving apparatus which can initiate and stop the operation of a mechanism at will under control of signal sequences sent thereto; which can control the operation of a further means under control of a modified sequence of signals; and which can be reset in a normal starting condition, when desired, in response to a special signal sequence.

This application is a division of United States application Serial No. 654,561, which was filed March 15, 1946, and which issued on July 3, 1951, as Patent No. 2,558,888.

In order that the novel receiving apparatus may be described more clearly, it will be described as an element of a remote control system for controlling the operation of a garage-door-operating means and light circuit in the garage by signals sent from a sending apparatus in an automobile.

In the remote control system, the sending apparatus is arranged to send out a preassigned signal sequence containing a predetermined number of signals each consisting of oscillations at a selected frequency, $F_1$, followed by a further number of signals each consisting of oscillations at a different frequency, $F_2$, which may be followed by more signals at frequency $F_1$ and then more at frequency $F_2$, etc., until the desired signal sequence has been formed.

The novel receiving apparatus, which is used with the above sending apparatus, may be connected to the sending apparatus by wire or may be coupled to the sending apparatus by either an electromagnetic field or an electrostatic field. Electronic means at the receiving apparatus has one portion which is responsive only to oscillations having a frequency corresponding to frequency $F_1$ of the sending apparatus, and has another portion which is responsive only to oscillations having a frequency corresponding to frequency $F_2$ of the sending apparatus. These portions of the electronic means, which respond to these frequencies, receive the various signals which contain these frequencies and cause related stepping switches to make a step of movement each time a signal of their particular frequency is received, which switches, together, complete circuits to control relays if the proper sequence of signals has been received. The receiving apparatus can be readily changed to respond to different signal sequences merely by changing a few circuit connections from the stepping switches to the control relays.

The sending apparatus also is provided with means which can cause a distinctive signal sequence to be sent to the receiving apparatus to cause the receiving apparatus to be operated to restore various parts of the receiving apparatus to home or normal position before the sequence of signals is sent thereto, thus insuring that the receiving apparatus will always be set properly before it begins to respond to the signal sequence and will cause the operation of some further means only if the proper signal sequence is received.

The special restoring signals may have a particular characteristic which distinguishes them from the signals of the signal sequence, or they may consist of a certain preselected combination of signals similar to those used in the signal sequence.

As will be clear from the following description, the sending apparatus may be arranged to send out a signal sequence made up of signals consisting of oscillations at any one of three or more different frequencies, and, when this is done, the receiving apparatus will consist of a corresponding number of portions which respond selectively to various ones of the frequencies. These various portions will cause stepping switches to be operated according to the signals received and effect some desired control if the required signal sequence has been received.

The receiving apparatus of this embodiment will be capable of responding to a signal sequence using two frequencies and containing preselected numbers of signals which consist of oscillations at either of these frequencies.

The sending apparatus is coupled to the receiving apparatus either by an electromagnetic field or by an electrostatic field, depending upon the frequencies used in the signal sequence, the signals being radiated from an antenna or loop located at the sending apparatus and being received by an input means or antenna mounted on the garage, either inside or outside thereof.

With this antenna arrangement, the signal-receiving means of the receiving apparatus can be placed in existing structures without requiring that driveways or other approaches be torn up to receive the input means or antenna and without requiring that the antenna be placed along the driveway or approach. This is another important feature when the invention is embodied in the particular form being described and is being applied to existing structures.

It is an object of the invention, therefore, to provide a receiving apparatus which can respond to various ones of a plurality of preselected frequencies and can set up a condition, upon the receipt of a desired signal sequence, to cause some other apparatus to be operated.

It is a further object of the invention to provide a receiving apparatus which can respond to a signal sequence to initiate an operation of a mechanism and can respond to a further signal sequence to interrupt said operation of the mechanism before the normal operation thereof is finished.

It is a further object of the invention to provide a receiving apparatus which can respond to one signal sequence to initiate an operation; can respond to a modified signal sequence to initiate said operation and in addition thereto perform a further function; can respond to a further signal sequence to arrest the operation, at will; and can be reset to normal unoperated condition in response to a special signal sequence.

A further object of the invention is to provide a receiving apparatus which can be adjusted readily to change the controls and enable the receiving apparatus to cause an operation in response to a different signal sequence.

A further object of the invention is to provide a novel receiving apparatus for a remote control system, which apparatus is particularly adapted for use in controlling the opening and closing of closures or garage doors from a vehicle such as an automobile.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Figs. 1-A and 1-B, taken together, form a circuit diagram of the receiving apparatus and the means controlled thereby.

*General description*

The novel receiving apparatus is adapted to respond to signals of two types which are sent thereto in predetermined combinations from a sending apparatus. This sending apparatus may consist of an electron-coupled oscillator and a controller which can control the oscillator to cause the oscillator to oscillate selectively at either of two selected frequencies to enable signals, made up of oscillations at either one or the other of these frequencies, to be generated.

The oscillator contains a vacuum tube which is provided with an inductance and capacitance in parallel in its grid circuit, the values of inductance and capacitance being so chosen that they will cause the oscillator to oscillate at a desired frequency $F_1$ to enable signals made up of oscillations at this frequency to be produced. When it is desired to cause the oscillator to oscillate at a different frequency, $F_2$, a second capacitor, which provides an additional capacitance, is connected across the inductance and in parallel with the other capacitance and enables signals made up of oscillations at this second frequency, $F_2$, to be generated.

The controller is a step-by-step operating switch which has one portion to control when the additional capacitance will be effective and thus controls the frequency at which the oscillator will operate, and has another portion to determine when the oscillator will operate.

At the end of an operation of the sending apparatus, the switch in the controller will be located in its normal or home position. When the switch is given its first step of movement, it connects the second capacitor to a vibrator which is operable to connect the additional capacitance across the inductance and the other capacitance and disconnect it therefrom at a high rate of speed. This causes the oscillator to produce signals made up of oscillations at $F_1$ and signals made up of oscillations at $F_2$ alternately in rapid succession. As long as the switch remains in the position which is one step out of home position, the rapidly alternating signals made up of oscillations at $F_1$ and $F_2$ will be generated. In the embodiment used to explain the invention, these signals will be distinctive from the signals of a signal sequence and will be effective to cause the receiving apparatus to operate and restore various parts thereof to their home or unoperated condition. This restoration of the parts of the receiving apparatus eliminates any error which might otherwise arise due to the unintentional operation of the receiving apparatus by stray signals or static, and insures that the receiving apparatus will respond properly only when the required signal sequence has been received.

After the switch has been in its first position long enough to allow the parts of the receiving apparatus to be restored, it can be given another step of movement to its second position, where a third portion of the switch takes over and causes the switch to operate automatically step by step forward until it resumes its home position. During this automatic operation of the switch, its first-named portion controls the oscillator to produce the signal sequence containing predetermined numbers of signals, each of which signals will contain oscillations at one or the other of the different selected frequencies.

In the instant embodiment, the normal signal sequence for causing an operation of the door-operating mechanism will consist of three signals, each of which is made up of oscillations at $F_1$, followed by four signals, each of which is made up of oscillations at $F_2$, then by two signals at $F_1$, six signals at $F_2$, and finally three signals at $F_1$. When it is dark and the lights of the automobile are lighted, means in the light circuit of the automobile will modify the control by the first- and second-named portions of the switch to cause an additional signal at $F_2$ to be transmitted following the normal signal sequence, which additional signal will be effective to control the light circuit in the garage to cause the lights in the garage to be lighted or extinguished as required.

If, after an operation of the door-operating mechanism has been initiated, it is desired to stop the operation of this mechanism, the stepping of the switch to its first position out of normal, or restoring position, will, as an incident to the restoring of the parts of the receiving apparatus, cause the operation of the mechanism to be interrupted immediately.

The sending apparatus and the receiving apparatus are coupled by either an electromagnetic field or an electrostatic field which radiates from a coil or antenna located at the front of the automobile each time a signal is generated.

The receiving apparatus operates from the usual 60-cycle alternating current at about 115 volts and contains one portion which is tuned to respond to oscillations at frequency $F_1$ and can receive signals made up of oscillations at this frequency, and contains another portion which is tuned to respond to oscillations at the other frequency, $F_2$, and can receive signals made up of oscillations at this frequency. Each portion of the receiving apparatus contains a signal-amplifying means, a thyratron, a relay, and a stepping switch, and, when a signal is received by a portion, it will fire the thyratron, which will cause its related relay to operate to close a circuit to the operating magnet of its related stepping switch. During the reception of either the normal signal sequence or the modified signal sequence, these circuits will cause the stepping switch related to the portion receiving the signal to make a step of movement for each signal received. These stepping switches, as they operate in response to the signals of the sequence, operate auxiliary control relays which, if the proper signal sequence is received, will cause the operation of the door-operating mechanism to be initiated.

When the signals at $F_1$ and the signals at $F_2$, which are sent alternately in rapid succession from the sending apparatus when the switch in the sending apparatus is in its first step from home position, are received, they will cause the relays in their related portions to operate. Due to the rapidity of the alternation of the signals and to the time lag in the release of the relays, relays in both portions will be operated at the same time, and, when both relays are thus operated, the circuits which are normally closed by the receipt of the signals of the sequence will not be closed, but, instead, restoring circuits will be closed to cause the stepping switches, if displaced from normal position, to be stepped back into their home position and to cause the auxiliary control relays and other portions of the receiving apparatus to be restored to their unoperated position.

In the embodiment used to explain the invention, the operation of both relays by the rapidly alternating signals is also utilized to control means to open the circuit to the door-operating mechanism to immediately arrest further movement of the door thereby.

The simultaneous operation of both relays in a restoring operation has been utilized to cause the stopping of the door-operating mechanism only because it is a convenient way to accomplish this result in the embodiment used to explain the invention. It is obvious that, if desired, the stopping function could be divorced from the restoring function and separate means, controlled by special signal combinations, could be provided to accomplish each of these functions.

When the automobile lights are on and the additional signal at $F_2$ is received, it will cause its related stepping switch to operate to a position where it can cause the operation of a garage light circuit controlling means to cause the lights to be lighted or extinguished as required.

The receiving apparatus can readily be changed to utilize different frequencies merely by tuning the portions of the receiving apparatus to respond to these new frequencies. Similarly, the receiving apparatus can readily be changed to produce a control in response to a different signal sequence merely by making a few simple changes in the circuits between the stepping switches and the auxiliary relays of the receiving devices.

The details of the sending apparatus which is utilized to send the various signal sequences to the novel receiving apparatus will not be given herein, but reference may be had to said application Serial No. 654,561 for details of such an apparatus if desired. Details of the receiving apparatus used in the preferred embodiment of the invention will now be described.

Detailed description

Figure 1A:
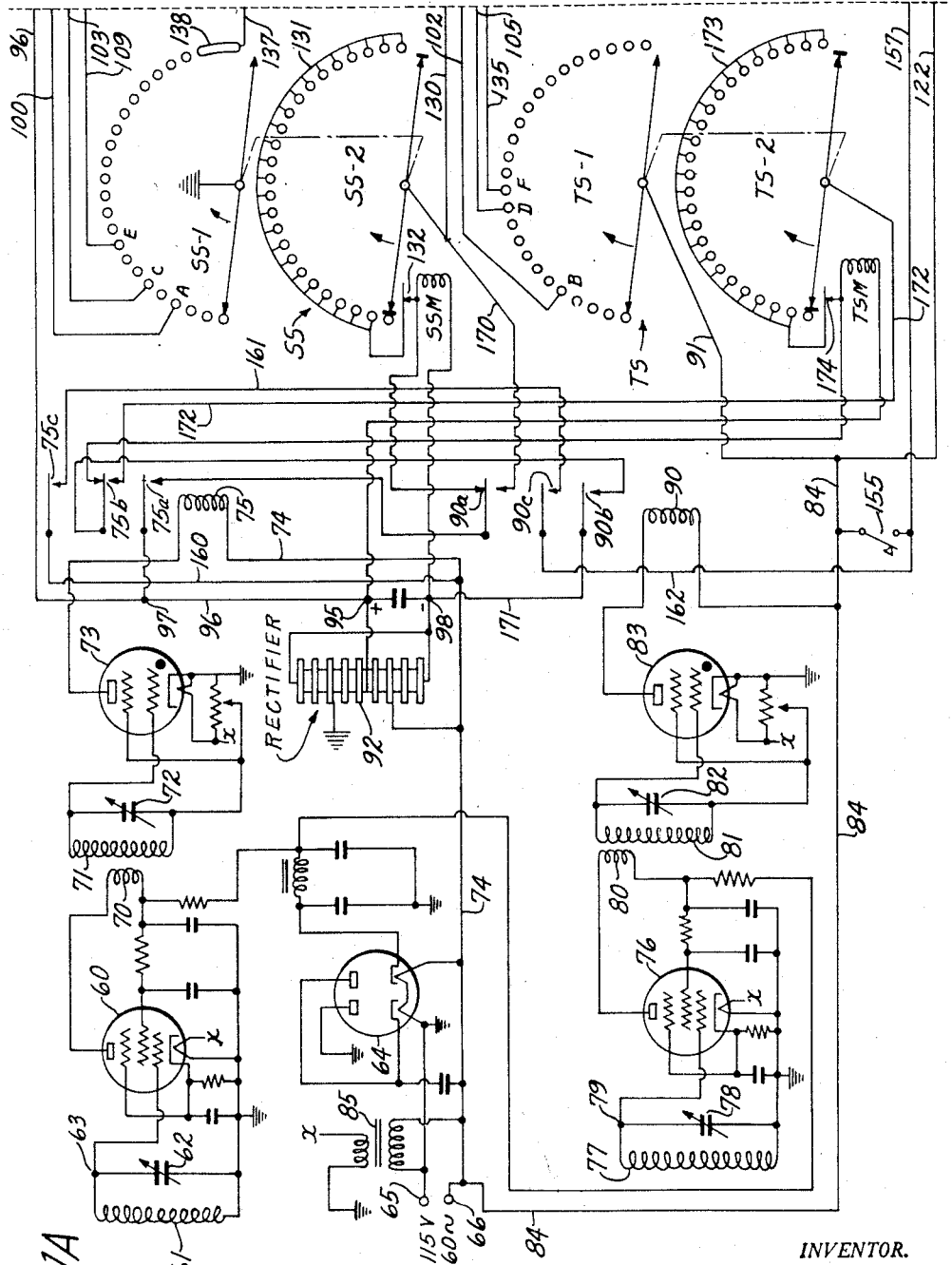

The circuit diagram for the receiving apparatus and for the closure-operating mechanism and light-controlling circuits controlled thereby is shown in Figs. 1-A and 1-B.

In the disclosed embodiment of the invention, in which the receiving apparatus is used as a part of a remote control system for controlling the initiation and arresting of the operation of a garage-door-operating means, the receiving apparatus, which is very small and compact, can be readily mounted in existing garages or in newly-constructed ones and can be operated by the usual power supply, as 60-cycle alternating current at about 115 volts.

One portion of the receiving apparatus is responsive only to signals sent thereto which are made up of oscillations at a frequency corresponding to frequency $F_1$ of the sending apparatus. This portion of the receiving apparatus contains a signal-amplifying vacuum tube 60 (Fig. 1-A), having its control grid connected to a circuit which contains an inductance coil 61 and a capacitor 62 and which is so tuned that it will resonate at frequency $F_1$ and will allow tube 60 to become operable only when a signal made up of oscillations at frequency $F_1$ is received.

When the sending apparatus and the receiving apparatus are to be coupled by an electromagnetic field, the input means, which will be the coil 61, can be mounted on the garage, either inside or outside thereof, and can pick up the signals sent thereto. If an electrostatic coupling of the sending apparatus and the receiving apparatus is to be used, the input means will be a single straight wire antenna, which can be mounted on the garage, either inside or outside thereof. This antenna would be directly connected to point 63 in the tuned circuit, which is connected to the control grid of the tube 60.

Regardless of whether the input means is a coil or a straight wire antenna, it can readily be installed in existing construction without requiring extensive alteration to the construction and without requiring that the coil or antenna be placed along the driveway or approach or that the driveway or approach be torn up to receive the coil or antenna, as was necessary heretofore, as shown in the United States Patents Nos. 1,760,479 and 2,118,930, which issued, respectively, to H. D. Coleman and E. D. Lilja.

The anode of tube 60 derives its operating potential of about 250 volts D. C. from the output of a voltage-doubling rectifier tube 64, which is operated by the usual 60-cycle alternating current at a voltage of about 115 volts, which is supplied at terminals 65 and 66, terminal 65 being connected to ground.

Included in the circuit to the anode of tube 60 is a primary coil 70 of a transformer. The secondary coil 71 of the transformer is included in a circuit with the capacitor 72, which circuit is also tuned to resonate at frequency $F_1$ and is connected to the control grid of a gaseous electron-discharge tube or thyratron 73 to control the firing of the thyratron when signals at frequency $F_1$ are received. The signal-amplifying tube 60 and its coupling through the tuned secondary of the transformer to the control grid of the thyratron, insure that the signals on the control grid of the thyratron 73 will be of sufficient strength to cause the thyratron to fire and become conducting each time a signal made up of oscillations at frequency $F_1$ is received while the thyratron has positive potential applied to its anode.

The anode of thyratron 73 is connected over conductor 74 to terminal 66 and is supplied with an alternating voltage of about 115 volts with respect to the grounded cathode of the thyratron. Whenever its anode is given a sufficient positive potential relative to its cathode, the thyratron 73 will be in operative condition, and, if a signal made up of oscillations at frequency $F_1$ is received at this time, the control grid will allow the thyratron to fire and become conducting. Once the thyratron becomes conducting, it will continue to conduct until it is extinguished, which extinguishing action occurs when the potential of its anode relative to its cathode either becomes too small to support conduction or becomes negative.

A relay 75 is included in the circuit to the anode of the thyratron 73 and receives current whenever conduction occurs in the thyratron. The operating characteristics of the relay are such that the relay is much slower to release than to operate, and it is this slow-to-release characteristic which is utilized during restoring operations of the receiving apparatus, as will be explained more fully hereinafter.

In the receiving apparatus, there is another portion similar to the one just described but which is responsive only to signals which are made up of oscillations at a frequency corresponding to the frequency $F_2$ of the sending apparatus. This portion also contains a signal-amplifying vacuum tube 76 (Fig. 1-A) having its control grid connected to a tuned circuit containing an inductance coil 77 and a capacitor 78 and tuned to resonate at frequency $F_2$. As in the case of coil 61, coil 77 can be the input means and can also be mounted on the garage to pick up signals if the sending apparatus and the receiving apparatus are coupled by an electromagnetic field. If the sending apparatus and the receiving apparatus are to be coupled by an electrostatic field, then the input means can be a single straight wire antenna, which can be mounted on the garage and can be connected to the tuned circuit at point 79.

Tube 76 also receives its anode potential from the voltage-doubling rectifier tube 64 and has the primary coil 80 of a transformer included in its anode potential supply circuit.

The secondary coil 81 of the transformer is included in a circuit with the capacitor 82, which circuit is also tuned to resonate at frequency $F_2$ and is connected to the control grid of a thyratron 83.

The anode of thyratron 83 is connected over conductor 84 to terminal 66 and is also supplied with an alternating voltage of about 115 volts with respect to the grounded cathode of this thyratron. Whenever its anode is given a sufficient positive potential relative to its cathode, the thyratron 83 will be in operative condition and can be fired and rendered conducting, if a signal made up of oscillations at frequency $F_2$ is received at this time.

A relay 90, which is similar to relay 75, is included in the circuit to the anode of the thyratron 83 and receives current whenever conduction occurs in the thyratron.

The heater filaments of the vacuum tubes 60 and 76 and the thyratrons 73 and 83 each have one side, marked with an "$x$," connected to one side of a step-down transformer 85, also marked with an "$x$," and are supplied with heating current therefrom.

Because the voltage applied to the filaments of thyratrons is also used to provide bias for their control grids to prevent conduction in the thyratrons unless signals are received, the filaments for the thyratrons are suitably connected to the transformer 85 so as to have a potential applied thereto which is 180 degrees out of phase with the potential applied to the anodes. The connections between the points "$x$" at the heater filaments and the point "$x$" at the transformer are direct conductive connections which are not shown in Fig. 1-A.

The relays 75 and 90 jointly operate to control the operation of a pair of step-by-step operating selector switches of the type which is operated by a magnet and causes a step of operation to occur upon each release of the magnet.

One of the selector switches, SS, is related to the portion of the receiving apparatus which responds to signals which are made up of oscillations at frequency $F_1$. This first selector switch has a selector portion SS–1 (Fig. 1-A), consisting of a bank of contacts and a wiper which is grounded and which can make contact with the contacts of the bank, one after another in succession, to set up circuit conditions to auxiliary relays after certain predetermined numbers of operations of the switch. This selector switch also has a homing portion SS–2, consisting of a bank of contacts and a wiper which engages the contacts one after another in succession as the switch is operated step by step. This portion, when rendered effective, can cause the switch to be stepped forward step by step automatically until the switch is in home position. The wipers of portions SS–1 and SS–2 of this selector switch are shown in their home position in Fig. 1-A.

The wipers of portions SS–1 and SS–2 are insulated from each other but are connected together for rotary movement and are stepped past the contacts of their related banks by an operating magnet SSM, which is effective, through the usual magnet armature operated pawl-and-ratchet drive, to cause the wipers to make one step of movement upon each restoration of the magnet armature to unoperated condition after it has been operated.

The other selector switch, TS, is related to the portion of the receiving apparatus which responds to signals which are made up of oscillations at frequency $F_2$. This second selector switch has a selector portion TS–1, consisting of a bank of contacts and a wiper which is connected over conductors 91 and 84 to the ungrounded terminal 66 and which can make contact with the contacts of the bank one after another in succession to complete circuits through auxiliary control relays and the selector portion SS–1 of the first selector switch after certain predetermined numbers of operations of this second selector switch. This second selector switch also has a homing portion TS–2, consisting of a bank of contacts and a wiper which engages the contacts one after another in succession and is operable, when rendered effective, to cause the switch to be stepped forward step by step automatically until the switch is in its home position. The wipers of portions TS–1 and TS–2 of this selector switch are shown in their home positions in Fig. 1-A.

The wipers of portions TS–1 and TS–2 are also insulated from each other but are connected for joint rotary movement to make one step of movement each time the armature of the operating magnet TSM for this switch is restored to unoperated condition after having been operated.

The operating potential for the operating magnets SSM and TSM for the selector switches is obtained from a rectifier 92 (Fig. 1-A), which is connected between the alternating current potential supply conductor 74 and ground. When a signal which is made up of oscillations at frequency $F_1$ is received and relay 75 is operated, it will complete the following circuit to energize the operating magnet SSM: from point 95, over conductor 96, point 97, operated relay contact 75a, unoperated relay contact 90a, winding of operating magnet SSM and back to point 98. The potential between points 95 and 98 is about 125 volts D. C. and will cause magnet SSM to be energized when this circuit is closed. Magnet SSM will remain energized until relay 75 is released after the particular signal which is made up of oscillations at frequency $F_1$ has been received. Upon deenergization of magnet SSM, the wipers in portions SS-1 and SS-2 will make one step of movement clockwise (Fig. 1-A). It will be noted that the above circuit to magnet SSM extends over unoperated contacts of relay 90 and would not have been completed by the operation of relay 75 if relay 90 had been energized and had moved contact 90a to its operated position before contact 75a was moved to its operated position.

In a similar manner, when a signal which is made up of oscillations at $F_2$ is received, relay 90 will be operated to complete the operating circuit for switch-operating magnet TSM if relay 75 has not been operated. The circuit completed by the operation of relay 90 extends from point 95, which is connected to the positive side of the rectifier 92, over the winding of magnet TSM, unoperated relay contact 75b, and operated relay contact 90b to point 98, which is connected to the negative side of the rectifier 92. If relay 75 has been energized and contact 75b had been operated when relay 90 was energized, relay 75 would have interrupted the energizing circuit to TSM.

Accordingly, in the normal operation of relay 75, it will complete the circuit to its related magnet SSM at contact 75a and will interrupt the circuit to magnet TSM at contact 75b, and similarly relay 90 will complete the circuit to its related magnet TSM at contact 90b and will interrupt the circuit to magnet SSM at contact 90a.

A clear understanding of the function of these selector switches will be had by considering their operation during the reception of the particular normal and modified signal sequences used in the instant embodiment and explained earlier herein.

After the receiving apparatus has been restored to normal or home position, the operation of an "Operate" switch in the sending apparatus will initiate the automatic sending of either a normal or a modified signal sequence. As these signals are received by the receiving apparatus, the first three signals, which are made up of oscillations at frequency $F_1$, will, through signal-amplifying tube 60 and thyratron 73, cause relay 75 to operate three times to energize the operating magnet SSM three times to cause the wiper of portion SS-1 to make three steps of movement and engage the contact in the position marked "A," where it connects ground to conductor 100 (Figs. 1-A and 1-B), which is connected to one side of auxiliary control relay 101 (Fig. 1-A). The next four signals of the sequence, which are made up of oscillations at frequency $F_2$, will, through the signal-amplifying tube 76 and the thyratron 83, cause relay 90 to operate four times to energize the operating magnet TSM of the other selector switch four times to cause the wiper of portion TS-1 to make four steps of movement and engage the contact in position marked "B," from which contact a conductor 102 (Figs. 1-A and 1-B) extends to the other side of the auxiliary control relay 101.

Since the wiper in portion TS-1 is connected to the ungrounded potential supply terminal 66 and the wiper in portion SS-1 is connected to ground when the wipers are in positions "B" and "A," respectively, they will complete the energizing circuit for the auxiliary control relay 101 and will cause this relay to operate.

The auxiliary control relay 101 is of the type in which its contacts, once operated, will remain locked in operated position even though the energizing circuit to the relay is interrupted and until a special restoring magnet is operated to unlock the contacts.

Upon receipts of three signals made up of oscillations at $F_1$ and four signals made up of oscillations at $F_2$, therefore, auxiliary control relay 101 will be operated, and its contacts 101a and 101b will be locked in operated position.

After four signals which are made up of oscillations at frequency $F_2$ have been received, the next two signals, which are made up of oscillations at frequency $F_1$, will cause the wiper of portion SS-1 to move two steps farther and engage contact in position marked "C," which contact is connected over conductor 103 to one side of a second auxiliary control relay 104, the other side of which relay is connected to conductor 102, extending to the contact in the position marked "B" in the portion TS-1 and upon which the wiper has remained. The movement of the wiper of portion SS-1 into engagement with the contact in the position marked "C" completes the energizing circuit for the second auxiliary control relay 104, whose contacts 104a and 104b operate and are locked in operated position.

Six signals which are made up of oscillations at $F_2$ follow the two signals which are made up of oscillations at $F_1$ and cause the wiper in portion TS-1 to move six steps farther into engagement with the contact in position marked "D," which contact is connected over conductor 105 (Figs. 1-A and 1-B) to one side of a third auxiliary relay 106, the other side of which relay is connected over conductor 103 to contact in position marked "C" in portion SS-1. Since the wiper in portion SS-1 does not move from the contact in position marked "C," while the wiper in portion TS-1 is moving six steps into engagement with the contact in position marked "D," the movement of the wiper of portion TS-1 into engagement with contact in position marked "D" will complete the energizing circuit for the third auxiliary control relay 106, whose contacts 106a and 106b operate and are locked in operated position.

At this stage of the operation of the receiving apparatus, the three auxiliary control relays, 101, 104, and 106, will have closed their contacts 101a and 101b, 104a and 104b, and 106a and 106b.

After the six signals which are made up of oscillations at frequency $F_2$ have been received, the last three signals of the normal signal sequence, which signals are made up of oscillations at frequency $F_1$, will cause the wiper in portion SS-1 to make three further steps of movement to engage the contact in position marked "E" and apply ground thereto. The contact in the position marked "E" is connected over conductor 109 (Figs. 1-A and 1-B), closed contacts 101a, 104a, and 106a, and conductor 110 to one side of relays 111 and 112, which initiate the operation of the door-operating mechanism when operating potential is supplied to the other side of their windings.

The door-operating mechanism may be of any suitable and well-known type, and, as shown schematically in Fig. 1-B, includes a reversible motor 115 adapted to drive a door-actuating device 116.

Also included in the door-operating mechanism is a switching device 117, which is set by the actuating device to either of two positions, depending upon whether the door has been moved to closed or open position. As the actuating device 116 moves the door to closed position, suitable means thereon, as a lug 118, will engage the switching device 117, which is of the snap-switch type, and will move the switching device 117 into engagement with the contact 119, which is connected to relay 111. This is the condition shown in Fig. 1-B. As the operating device 116 moves the door to open position, other means thereon, as lug 120, will engage the switching device and snap it over into engagement with contact 121, which is connected to relay 112.

The switching device 117 is connected over conductors 122 and 84 to the ungrounded terminal 66 (Fig. 1-A), so that, with the door in closed position and the switching device 117 in the position shown in Fig. 1-B, operating potential will be applied to relay 111. The circuit for relay 111 extends from terminal 66 (Fig. 1-A), over conductors 84 and 122, switching device 117, contact 119, winding of relay 111, conductor 110, the contacts 106a, 104a, 101a, and conductor 109 to contact in position marked "E" in portion SS-1, which contact is connected to ground over the wiper which has moved into engagement therewith. Energization of relay 111 will initiate a door-opening operation.

With the door in open position, the switching device 117 will be in engagement with the contact 121, and the circuit to relay 112 will be completed in a similar manner when the wiper in portion SS-1 engages the contact in the position marked "E" after the switches 101a, 104a, and 106a have been closed. Energization of relay 112 will initiate a door-closing operation.

When relay 111 is energized, it closes three contacts, 111a, 111b, and 111c, of which contact 111a completes a holding circuit to ground, contact 111b grounds one side of one winding of the motor over conductor 125, which will cause the motor to operate in that direction which opens the door, and contact 111c completes a circuit to cause the portion SS-2 of the selector switch to be effective to cause the stepping of the selector switch forward to home position in a manner to be described later herein.

Motor 115 has operating potential applied thereto by being connected to the ungrounded terminal 66 (Fig. 1-A), over point 126, conductor 127, contacts 101b, 104b, 106b, and conductors 122 and 84 and will operate when relay 111 grounds conductor 125 at contact 111b.

When relay 111 has initiated the operation of the motor 115 to open the door, the motor will, unless otherwise controlled, continue to drive the actuating device 116 until the lug 120 shifts the switching device 117 to open the circuit to relay 111, which becomes deenergized and removes ground from conductor 125 at contact 111b and thereby stops the motor.

The energization of relay 112 produces a result similar to that provided by relay 111; however, contact 112b applies ground to one side of another winding of the motor 115 over conductor 128, which causes the motor to run in the opposite direction and drive the actuating device 116 in the direction necessary to close the door. Contacts 112a and 112c perform functions similar to contacts 111a and 111c; namely, provide a holding circuit for the relay and complete a circuit to cause the portion SS-2 of the selector switch to be effective to step the switch forward into its home position.

It is clear from the above that, upon receipt of the proper normal signal sequence, the door-operating mechanism will be set in operation to open or close the garage door as required. It is also clear that the door-operating mechanism can be set in operation in response to a different signal sequence merely by changing the connections from the auxiliary control relays 101, 104, and 106 and conductor 109 from the contacts marked "A," and "B," "C," "D," and "E" in Fig. 1-B to other contacts as required by the different signal sequence. Accordingly, the receiving apparatus can readily be preset to respond to any desired signal sequence.

When either relay 111 or 112 is energized and closes contact 111c or 112c, it will render the homing portion SS-2 of the first selector switch operable to cause this switch to be stepped forwardly automatically until it reaches its home position. This is accomplished as follows. When contact 111c or 112c is closed, it connects a circuit from the positive side of the rectifier 92 (Fig. 1-A) over point 95 and conductor 96 (Figs. 1-A and 1-B) to conductor 130 and wiper in portion SS-2.

It will be recalled that wipers in portions SS-1 and SS-2 move in unison, so that, when the wiper in portion SS-1 is in engagement with the contact in the position marked "E," the wiper in portion SS-2 will be in engagement with a contact in a corresponding position in its related bank of contacts. As seen in Fig. 1-A, contacts in positions 2 through 24 in portion SS-2 are connected to a conductor 131, which is connected to one side of the winding of the operating magnet SSM over a normally closed contact 132, which is opened each time the operating magnet SSM is energized.

The circuit traced above from the positive side of the rectifier 92 over conductor 96, contacts 111c or 112c, and conductor 130 continues over the wiper and the remaining contacts of its related bank as the wiper engages them in succession, conductor 131, contact 132, winding of operating magnet SSM to point 98, which is connected to the negative side of the rectifier 92. This circuit will cause the operating magnet SSM to step the wipers forward until they reach their home position, as shown in Fig. 1-A, in which position the contact of the bank is not connected to conductor 131 and stops the automatic operation of the switch.

This automatic homing operation of the selector switch moves the wiper in the portion SS–1 from the contact in position marked "E" and removes ground from conductor 109 to prevent an improper energization of relay 111 or 112 when the switching device 117 is snapped from one position to the other near the end of an operation of the actuating device 116.

The operation of the garage-door-operating mechanism can also be initiated by the momentary closing of a manually-operable "Start" key 145 (Fig. 1–B), located at the garage or at any other suitable place, which key closes contact 146, which grounds the conductor 110 extending to relays 111 and 112, and also closes contact 147, which supplies operating potential to the motor 115 by connecting the motor to ungrounded terminal 66, over point 126, conductor 127, conductor 148, contact 147, and conductors 149, 122, and 84.

A holding relay 150 in a circuit between point 126 and conductor 110 is energized when the "Start" key grounds conductor 110 and also applies operating potential to point 126. Relay 150 at its contact 150a connects point 126 directly to conductor 149 to by-pass the contact 147 to maintain operating potential on the motor after the key 145 has been released.

A manually-operable "Stop" key 155 (Fig. 1–A), located at the garage or in any other suitable place, when operated, connects operating potential to a conductor 157 (Figs. 1–A and 1–B), which is connected to one side of a release relay 156 (Fig. 1–B), the other side of which relay is connected to ground. When the "Stop" key 155 is operated, relay 156 will operate and open contact 156a in the circuit of relay 150 to cause relay 150 to be deenergized to open contact 150a in the potential-supplying circuit for the motor 115, thereby stopping the motor and the garage-door-operating mechanism at any point in its operation.

As explained earlier herein, the sending apparatus in the automobile will send out a modified signal sequence containing the signals of a normal signal sequence plus an additional signal made up of oscillations at frequency $F_2$ when the sending apparatus is operated and the lights of the automobile are lighted. When this occurs, the signals corresponding to the normal signal sequence will cause the door-operating mechanism to operate, and the additional signal will cause the wiper in portion TS–1 to move one step farther to engage the contact in position marked "F" and place operating potential on this contact. Conductor 135 (Figs. 1–A and 1–B) connects the contact in the position marked "F" to one side of a garage light circuit controlling relay 136 (Fig. 1–B), the other side of which relay is connected over conductor 137 (Figs. 1–A and 1–B) to a contact 138 in the portion SS–1 and is connected to ground when the wiper in portion SS–1 engages contact 138 near the end of the homing operation of this selector switch. This causes the relay 136 to be energized shortly after the operation of the door-operating mechanism has been initiated.

When relay 136 operates, it is effective through a pawl 139 and a ratchet 140 to operate the cam 141 one step to control the shifting of the blade 142 to selectively engage contacts 143 or 144 in the garage light circuit. The blade 142 and the contacts 143 and 144 form one switch in the well-known three-way circuit used to control the circuit to the garage lights and enable the control from the automobile to cause the lights to be either turned off or on as required. The light circuit also includes a manually-operable switch 142a.

As explained earlier herein, the sending apparatus, with the controller in its first position out of normal or home position, sends out signals made up of oscillations at $F_1$ and signals made up of oscillations at $F_2$, which signals are alternated rapidly in succession. These rapidly-alternating signals operate the receiving apparatus to restore various parts thereof to home or normal position before either the normal or the modified signal sequence is sent to the receiving apparatus. This restoration of the parts of the receiving apparatus will eliminate any erroneous setting of the receiving apparatus which might have been due to unwanted reception of stray signals or static and will insure that the receiving apparatus will respond properly to the signals of the signal sequence.

The two types of signals alternate with such speed that at least one signal which is made up of oscillations at frequency $F_1$ and one signal which is made up of oscillations at frequency $F_2$ will be received in the positive half of each cycle of alternating potential applied to the anodes of thyratrons 73 and 83, causing both thyratrons to be fired in each cycle. As the thyratrons 73 and 83 conduct, they energize their respective relays 75 and 90, causing both relays to be operated at about the same time.

Even though the thyratrons 73 and 83 are extinguished and current flow therethrough is interrupted during the negative half of each cycle of alternating potential applied to their anodes, the relays 75 and 90 will remain operated because the time required for the armatures of the relays to leave their operated position, after current is interrupted to their winding, exceeds that time during which potential on the anodes is negative.

With both relays 75 and 90 operated at the same time, a circuit is completed to one side of restoring relays 156, 163, 164, and 165 from conductor 74 (Fig. 1–A), over conductor 160, operated contact 75c, conductor 161, operated contact 90c, conductor 162, and conductor 157. This circuit applies operating potential to one side of the restoring relays 156, 163, 164, and 165 (Fig. 1–B), which relays have their other sides connected to ground and become energized when potential is applied by this circuit over contacts 75c and 90c. Relay 156 interrupts the circuit to the holding relay 150 at contact 156a, and relay 150 opens the potential-supplying circuit to the motor 115 at contact 150a. Relays 163, 164, and 165, when operated, unlock contacts 101a and 101b, 104a and 104b, and 106a and 106b of the auxiliary control relays 101, 104, and 106, allowing these contacts to open and interrupt the circuits which extend thereover.

This interruption of the circuits over contacts 101a and 101b, 104a and 104b, 106a and 106b, and over contact 150a will stop the operation of the motor 115 and will arrest any further movement of the door, thus enabling the operation of the door-operating mechanism to be arrested by a control sent from the automobile.

While the energization of the restoring relays 156, 163, 164, and 165, which cause the operation of the door-operating mechanism to be interrupted, is shown as a part of the resetting operation, it is obvious that the circuit to these relays could be completed by some other signals instead of by the special restoring signals if the interruption of a door operation were to be divorced from the restoring operation.

The simultaneous operation of relays 75 and 90 also completes circuits to the homing portions SS-2 and TS-2 to cause the selector switches to be stepped forward to their home positions.

The circuit to the homing portion SS-2 extends from the positive side of the rectifier 92 (Fig. 1-A) over point 95, conductor 96, point 97, operated contact 75a, operated contact 90a, and conductor 170 to the wiper of portion SS-2. If this selector switch is not in home position, the wiper will be engaged with one of the contacts connected to conductor 131, and the circuit will continue over contact 132 and the winding of operating magnet SSM to point 98, which is connected to the negative side of the rectifier 92. This circuit will cause the wipers SS-1 and SS-2 to be stepped forward into their home position, where wiper in portion SS-2 engages a contact which is not connected to conductor 131 and stops further movement of the wipers. If this selector switch is in home position as a result of a previous operation of relay 111 or 112, the circuit over operated contacts 75a and 90a will have no effect thereon.

The circuit to the homing portion TS-2 extends from the negative side of the rectifier 92, over point 98, conductor 171, operated contact 90b, operated contact 75b, and conductor 172 to the wiper of portion TS-2. If the selector switch is not in home position, the wiper will be in engagement with one of the contacts connected to conductor 173, and the circuit will continue over contact 174, the winding of operating magnet TSM to point 95, which is connected to the positive side of the rectifier 92. This circuit will cause wipers in portions TS-1 and TS-2 to be operated step by step until they engage the contacts in home position, the contact in home position in portion TS-2, not being connected to conductor 173, interrupting the homing circuit to operating magnet TSM.

It is clear from the above description that, when the signals which are made up of oscillations at F1 and the signals which are made up of oscillations at F2 are received alternately in rapid succession, relays 75 and 90 will be operated concurrently and will complete circuits to the restoring relays 156, 163, 164, and 165 and to the homing portions SS-2 and TS-2 of the selector switches, to interrupt any operation of the door-operating mechanism which might be taking place, and to restore the various parts of the receiving apparatus to home or normal position in readiness to receive the signals in the normal signal sequence or in the modified signal sequence, the signals in the normal signal sequence causing an operation of the door-operating mechanism to take place, and the signals in the modified signal sequence also causing an operation of the door-operating mechanism and in addition thereto causing an operation of the garage light circuit.

It is clear that the circuit conditions which are set up in the receiving apparatus upon the receipt of the normal signal sequence or the modified signal sequence to cause relay 111 or 112 to operate and initiate any operation of the garage-door-operating mechanism in the embodiment given to illustrate the invention could readily be used to either operate or control the operation of some other mechanism, and that the additional signals of the modified signal sequence, which control the operation of the garage light circuit controlling means, could operate or control the operation of some other desirable mechanism.

While the form of the invention shown and described herein is admirably adapted to fulfill the objects primarily stated, it is to be understood that it is not intended to confine the invention to the one form or embodiment disclosed herein, for the novel remote control system is susceptible of embodiment in various forms all coming within the scope of the claims which follow.

What is claimed is:

1. In a remote control system for controlling the operation of a door-operating mechanism from a vehicle in response to a signal sequence of groups of each of two types of signals, the different types of signals consisting of oscillations at one or another of predetermined frequencies and the groups consisting of selected numbers of signals, with the type of signal alternating for successive groups, a receiving apparatus including the combination of input means for receiving signals sent thereto from the vehicle; an electronic means connected to said input means and responsive to signals which are made up of oscillations at one of said frequencies; differentially operable means which are operated under control of this electronic means and given an increment of movement each time one of these signals is received; other electronic means connected to said input means and responsive to signals which are made up of oscillations at the other of said frequencies; differentially operable means which are operated under control of said other electronic means and given an increment of movement each time one of these signals is received; and control means connected to the two differentially operable means and jointly controlled by said two differentially operable means after each group of signals is received during the reception of the signal sequence and rendered effective to initiate an operation of the door-operating mechanism when the differentially operable means have been operated by the particular combination of signals in the signal sequence.

2. In a remote control system for controlling a lighting circuit in a garage in response to a special signal sequence sent from a vehicle, the combination of a three-way circuit for controlling the garage lights, including a manually-operable switch and another switch jointly operable to control the opening and closing of the circuit; means to cause the operation of said other switch to selectively close or open the circuit to the garage lights; and means operable in response to the signals of a special signal sequence to cause an operation of the switch-operating means, whereby the lights of the garage can either be lighted or put out, as required, selectively by the manual switch or in response to control signals sent from the vehicle.

3. In a remote control system for controlling the operation of garage-door-operating mechanism of a garage in response to a signal sequence of groups of each of two types of signals sent from a vehicle, the different types of signals consisting of oscillations at one or another of predetermined frequencies, and the groups consisting of selected numbers of signals, with the type of signals alternating for successive groups, a receiving apparatus mounted in said garage, said receiving apparatus including input means mounted on the garage for receiving the signals sent thereto from the vehicle, including means connected to the input means and responsive to signals of said one type which are made up of oscillations at one of said frequencies, including means connected to the input means and responsive to signals of said other type which are made up of oscillations at the other of said frequencies, including differentially operable means operated different extents according to the number of signals of said one type in the various groups and operated by the means responsive to signals of said one type to advance one step each time one of these signals is received, including differentially operable means operated different extents according to the number of signals of said other type in the various groups and operated by the means responsive to signals of said other type to advance one step each time one of these signals is received, and including control means jointly controlled by said two differentially operable means in different positions thereof during the reception of the signal sequence and rendered effective to initiate an operation of the door-operating mechanism when the differentially operable means have been operated by the particular combination of signals in the signal sequence.

4. In a remote control system for controlling the operation of garage-door-operating mechanism of a garage in response to a signal sequence of groups of each of two types of signals sent from a vehicle, the different types of signals consisting of oscillations at one or another of predetermined frequencies and the groups consisting of selected numbers of signals, with the type of signal alternating for successive groups, a receiving apparatus, said receiving apparatus including a portion which contains a signal pick-up coil mounted at the garage for receiving the signals sent thereto from the vehicle, contains electronic means connected to the coil and responsive to signals of said one type which are made up of oscillations at one of said frequencies, and contain differentially operable means operated one step under control of the electronic means each time one of said signals is received and occupying a different predetermined position after each group of signals of said one type has been received, said receiving apparatus including another portion which contains a pick-up coil mounted at the garage for picking up signals sent thereto from the vehicle, contains electronic means connected to the coil and responsive to signals of said other type which are made up of oscillations at the other of said frequencies, and contains differentially operable means operated one step under control of the electronic means each time one of these signals is received and occupying a different predetermined position after each group of signals of said other type has been received, and said receiving apparatus including control means jointly controlled by said two differentially operable means in the various positions thereof as the groups are received and rendered effective to initiate an operation of the door-operating mechanism when the differentially operable means have been operated by a predetermined combination of signals in the signal sequence.

5. In a receiving apparatus for causing a desired control to be effected in response to a signal sequence consisting of a predetermined combination of groups of each of two types of signals, the groups consisting of selected numbers of signals with the type of signal alternating for successive groups, the combination of input means for receiving the signals; an electronic means connected to the input means and responsive to signals of one type, differentially operable means operated under control of this electronic means to make an increment of movement each time one of these signals is received; other electronic means connected to said input means and responsive to signals of the other type; differentially operable means which are operated under control of said other electronic means to make an increment of movement each time one of these signals of said other type is received; control means jointly controlled by said two differentially operable means during the reception of the signal sequence; and an operating circuit completed by the control means when the predetermined combination of groups of signals has been received.

6. The apparatus of claim 5 in which each differentially operable means includes a bank of contacts and a wiper moved step by step to engage various contacts of the bank, the wiper engaging a predetermined contact of the bank at the end of the reception of each of its related groups of signals.

7. The apparatus of claim 5 in which the control means includes a plurality of relays connected to the two differentially operable means to be energized therefrom, a different one of the relays being energized after the second group of signals and each group of signals thereafter if the proper numbers of signals to make up the predetermined combination are included in the various groups.

8. The apparatus of claim 5 in which each of the differentially operable means includes a bank of contacts and a wiper moved step by step to engage the contacts as the signals of a related group are received, the wiper engaging a predetermined contact at the end of the reception of each group; and in which the control means includes a plurality of relays connected to various ones of said predetermined contacts to be energized thereover, a different one of said relays being energized after the second group and each succeeding group has been received if the proper number of signals have been included in the groups.

9. In a receiving apparatus for controlling the initiation and interruption of an operation in response to different signal sequences sent thereto, one signal sequence containing groups of selected numbers of either of two types of signals with the type of signal alternating in successive groups, and the other signal sequence containing the two types of signals alternating in rapid succession, the combination of a normally open circuit which is adapted, when closed, to produce the desired operation; means responsive to signals of said one type; means responsive to signals of said other type; differentially movable means controlled by the means responsive to said one type of signal to be given an increment of movement each time one of said type of signals is received; differentially movable means controlled by the means responsive to said other of said types of signals to be given an increment of movement each time one of said other type of signal is received; control means jointly controlled by the differentially operable means in their respecive positions as each of the groups of signals is received and operable to close said operating circuit if the said one signal sequence has been received; and means jointly controlled by the two means which are responsive to the signals and operable when said other signal sequence is received to open the operating circuit.

10. In a receiving apparatus for controlling the initiation of an operation in response to a signal sequence containing a predetermined combination of signals of one or another type and formed by groups of signals containing selected numbers of signals with the type of signal alternating in successive groups, said receiving apparatus being capable of being reset in response to a different signal sequence containing the two types of signals alternating rapidly in succession, the combination of a normally open circuit which, when closed, causes said operation; means responsive to signals of said one type; means responsive to signals of said other type; means differentially movable from a starting condition under control of the means responsive to said one type of signal, said differentially operable means being given one increment of movement for each of said one type of signals which is received; further means differentially movable from a starting condition under control of the means responsive to said other type of signal, said further differentially operable means being given one increment of movement for each of said other type of signal which is received; control means including a plurality of self-locking relays energized from the two differentially operable means as the signal sequence is received, one of said relays being energized after the second group and after each succeeding group has been received if the proper number of signals have been included in the groups, said relays causing the operating circuit to be closed; resetting means controlled jointly by the two means which respond to the signals and operable, when the two types of signals are received alternately in rapid succession, to cause the differentially operable means to be returned to their starting condition and the locked relays to be released.

11. In a receiving apparatus for causing different controls to be effected in response to different signal sequences received thereby, the sequences being made up of predetermined combinations of signals of two types, the combination of a normally open circuit which, when closed, serves as the operating circuit for a mechanism; means operable in response to said two types of signals; means operated by the means responsive to the signals and effective upon receipt of one signal sequence made up of a predetermined combination of signals of said two types, to close said operating circuit; and means operated by the means responsive to the signals, and effective upon receipt of another signal sequence made up of a different predetermined combination of signals of said two types, for opening said operating circuit; said apparatus enabling the initiation and interruption of an operation to be controlled from a remote location by signal sequences sent thereto.

12. In a remote control system for controlling a garage-door-operating mechanism and a garage-lighting circuit in response to signal sequences sent from a vehicle, said signal sequences being made up selectively of two types of signals, one of said types of signals being formed by oscillations at one preselected frequency and the other of said types of signals being formed by oscillations at another preselected frequency, one of said signal sequences being a normal signal sequence which is made up of groups of various predetermined numbers of signals of said one type and groups of various predetermined numbers of signals of said other type, with the type of signals for successive groups of signals alternating until the normal signal sequence is completed, and another of said signal sequences being a modified signal sequence which is sent out when the car lights are lighted, said modified signal sequence being made up of said normal signal sequence and an additional predetermined number of signals of the type opposite the last type of the normal signal sequence, the combination of a receiving apparatus including means responsive to signals of said one type, including means responsive to signals of said other type, said two means in the receiving apparatus being operated differentially by the signals of their respective types, said receiving apparatus also including means jointly controlled by the differentially operable means to initiate an operation of the garage-door-operating mechanism, and including a garage-light-controlling means jointly controlled by the initiating means, when operated to initiate an operation of the door-operating mechanism, and by the differentially operable means which responds to signals of the additional signals, if the proper predetermined number of signals has been received, to be operable when these conditions are fulfilled; and a three-way garage light circuit jointly controlled by a manually operated switch and by a switch controlled by the light-controlling means to either light or put out the garage lights, as required, under control of either the manually operable switch or the switch operated by the light-controlling means in response to signals sent out from the vehicle.

CEBERN B. TRIMBLE.

References Cited in the file of this patent

UNITED STATES PATENTS

| Number | Name | Date |
| --- | --- | --- |
| 366,124 | McElroy | July 5, 1887 |
| 529,532 | Scribner | Nov. 20, 1894 |
| 1,760,479 | Colman | May 27, 1930 |
| 1,815,045 | Boddie et al. | July 21, 1931 |
| 2,041,079 | Lyle | May 19, 1936 |
| 2,095,688 | Ballentine | Oct. 12, 1937 |
| 2,465,925 | Purrington | Mar. 29, 1949 |